US007673394B2

(12) United States Patent
Ruppe, III

(10) Patent No.: US 7,673,394 B2
(45) Date of Patent: Mar. 9, 2010

(54) TEMPLATE FOR CUTTING WALL BOARD TO FIT FLUTED DECK CEILINGS

(76) Inventor: John P. Ruppe, III, 207 Barwick Way, Knightdale, NC (US) 27545

(*) Notice: Subject to any disclaimer, the term of this patent is extended or adjusted under 35 U.S.C. 154(b) by 99 days.

(21) Appl. No.: 12/108,677

(22) Filed: Apr. 24, 2008

(65) Prior Publication Data

US 2009/0265948 A1 Oct. 29, 2009

(51) Int. Cl.
*G01B 3/14* (2006.01)
*G01B 3/04* (2006.01)

(52) U.S. Cl. .............................. 33/562; 33/479; 33/566

(58) Field of Classification Search .................... 33/562, 33/474, 479, 563, 565, 566, 465, 468, 469, 33/470

See application file for complete search history.

(56) References Cited

U.S. PATENT DOCUMENTS

| | | | | | |
|---|---|---|---|---|---|
| D139,700 | S | * | 12/1944 | Truhon | D10/61 |
| 2,423,786 | A | * | 7/1947 | Morris | 33/468 |
| D167,043 | S | * | 6/1952 | Kintz | D10/64 |
| 3,071,171 | A | * | 1/1963 | Guerrero | 33/524 |
| 3,273,246 | A | * | 9/1966 | Siberini | 33/470 |
| 4,106,249 | A | | 8/1978 | Morton | |
| 4,335,557 | A | | 6/1982 | Morton | |
| 4,502,232 | A | * | 3/1985 | Broders | 33/527 |
| 4,696,113 | A | | 9/1987 | Rice | |
| 4,747,247 | A | | 5/1988 | Petersen, Jr. et al. | |
| 4,894,967 | A | | 1/1990 | Morton | |
| 4,924,594 | A | * | 5/1990 | Fernandes | 33/483 |
| 5,090,129 | A | | 2/1992 | Cunninghan | |
| 5,323,541 | A | | 6/1994 | Burnham | |
| 5,419,057 | A | | 5/1995 | Jackson | |
| 5,946,999 | A | * | 9/1999 | Kahn | 83/879 |
| 6,098,302 | A | * | 8/2000 | Gilliam | 33/562 |
| 6,434,848 | B1 | | 8/2002 | Gordon et al. | |
| 6,810,598 | B2 | | 11/2004 | Boys | |
| 6,829,833 | B2 | * | 12/2004 | Langman | 33/32.2 |
| 6,895,683 | B1 | | 5/2005 | Olsen | |
| 6,944,963 | B2 | * | 9/2005 | Amaru | 33/492 |
| 7,011,007 | B2 | | 3/2006 | Stein | |
| 7,191,538 | B1 | | 3/2007 | Ryszkiewicz | |
| 7,287,339 | B2 | | 10/2007 | Robertson | |
| 2007/0033822 | A1 | * | 2/2007 | Reck | 33/566 |
| 2009/0205216 | A1 | * | 8/2009 | Ai | 33/563 |

* cited by examiner

*Primary Examiner*—Christopher W Fulton
(74) *Attorney, Agent, or Firm*—Jim Passé; Passé Intellectual Property, LLC

(57) ABSTRACT

It is extremely important that wall board form a tight seal between the top of wall board and when fluted deck is the roof that meets the wall board. The present invention relates to a template useful for preparing wall board or related building material to match the fluting pattern of fluted deck panels to form a seal between the decking panels and walls of a building.

1 Claim, 4 Drawing Sheets

TEMPLATE FOR CUTTING WALL BOARD TO FIT FLUTED DECK CEILINGS

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a template useful for preparing wall board or related building material to match the fluting pattern of fluted deck panels to form a seal between the decking panels and walls of a building.

2. Description of Related Art

In commercial construction, such as large retail stores and warehouses, fluted metal roofing panels have become common. (For example, see the fluted decking panels taught in U.S. Pat. No. 4,747,247.) Typically, a series of fluted panels (also referred to as corrugated panels) are joined together at their edges and ends and supported by an array of metal trusses to form a continuous roof decking system. The fluted decking system is usually overlain with one or more layers of insulation and waterproofing materials, and is considered to be a cost effective means of providing a large, but robust roofing area.

In many buildings, the bottom of the fluted decking system forms the ceiling in the space just below the roof. Generally, fire and building codes mandate that interior walls run from the floor of the structure up to the ceiling and form a gap-free interface with the ceiling. Were the ceiling flat, forming such a gap-free interface would be relatively easy. However, when the ceiling is fluted, the wall board that constitutes the face of each wall must be cut to fit the fluting. This is a labor intense, and hence, costly process. Some jurisdictions permit wall board to be cut flush with the lower portion of the fluting and the gap filled with small pieces of wall board and sealed at the interface. This process is still time consuming, and hand cutting individual pieces is a method that is more likely to cause gaps between the wall board and the fluted deck.

BRIEF SUMMARY OF THE INVENTION

The present invention addresses a need in the building construction art to efficiently cut an edge of a sheet of wall board to conform to the fluting of fluted decking when the under side of such decking form the ceiling of the top story of a building. A first aspect of the present invention is a template for marking and cutting wall board and sheet goods to conform to the pattern of fluting of a fluted deck with the template comprising a blade having one or more grooves extending substantially the length of the blade wherein the groove has the same pattern of fluting as the deck to which conformity is desired.

In a basic embodiment of the first aspect, the template is comprised of a T-square having a rectangular blade, an edge aligning the cross member at one end of the blade and affixed perpendicularly to it, and a groove running substantially the length of the blade with the center line of the groove pattern parallel to the longer sides of the blade and the groove extending through the blade. The pattern of the groove corresponds to that of the fluting of the decking.

In an advanced embodiment, the template has all the elements of the first embodiment except the groove extends the full length of the blade dividing the blade into two complementary sections. The two sections can be positioned (and locked) close together for a narrow groove and further apart for a wider groove. Thus, the groove may be adjusted to accommodate a variety of marking instruments such as pencils, pens, chalk sticks, or scribes; or cutting tools including knife blades, saw blades, or router bits.

In an alternative advanced embodiment, the blade has two or more grooves of different patterns corresponding to two or more fluting patterns of roof decking. In another advanced embodiment, the blade is linearly adjustable with respect to the edge aligning cross member to allow the fluted pattern being cut in the wall board to align with the pattern of the decking. In yet another advanced embodiment, the edge aligning cross member may be pivoted (and lock) about a point where the center line of the blade and the center line of the cross member intersect allowing the blade to be positioned at various angles with respect to the cross member.

A second aspect of the present invention is a method of using the template from the first aspect to prepare a piece of wall board to conform to the fluting pattern of a fluted deck ceiling. In a first embodiment, the template is place on the piece of wall board with the blade (and consequently the groove) aligned parallel to the edge of the wall board that is to be made to conform to the deck fluting pattern. A marking instrument is run along the groove thus transcribing the fluted pattern of the groove to the surface of the wall board. The wall board is then cut along the transcribed line to render the wall board conforming to the fluting of the decking. A second embodiment is similar to the first embodiment except that instead of the marking then cutting the wall board, the wall board is cut in one operation by using the groove to guide the cutting tool.

DETAILED DESCRIPTION OF THE INVENTION

Figure 1A:
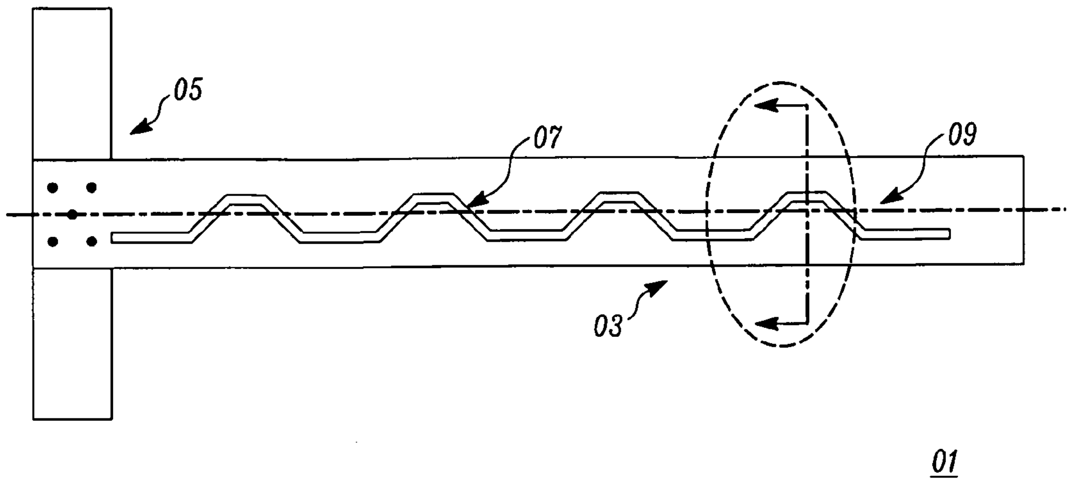
FIGS. 1*a*-1*d* depict the T-square template in its basic embodiment.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "a" or "an", as used herein, are defined as one as or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Figure 1B:
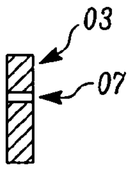

FIG. 1*a* shows a top view of the basic embodiment of the template of the present invention that comprises T-square 01 having rectangular blade 03, edge aligning cross member 05 affixed perpendicular to blade 03, and fluted pattern groove 07 extending through blade 03 as illustrated in cross sectional view, FIG. 1*b*. Conveniently, groove 07 runs substantially the length of the blade. The centerline 09 of groove 07 is parallel to the edges of blade 03 and perpendicular to the edge of cross member 05.

Figure 1C:
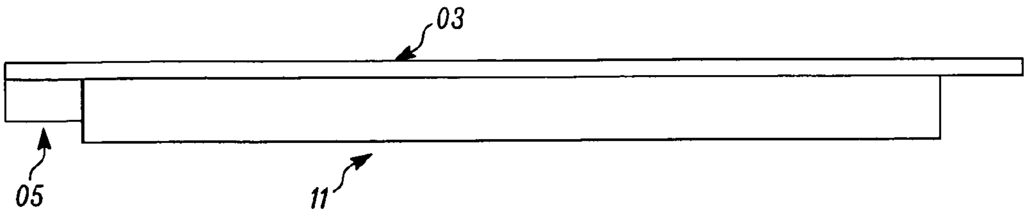
Figure 1D:
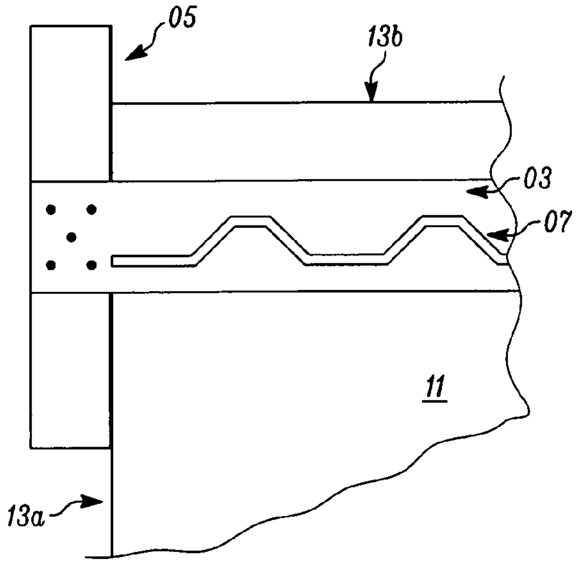

FIG. 1*c* is a side view showing that the edge aligning cross member 05 is affixed to the bottom side of blade 03 so that cross member 05 can be fitted against side 13*a* of a rectilinear piece of wall board 11 so that blade 03 is maintained parallel with adjacent side 13*b* of wall board 11, more clearly depicted in FIG. 1*d*. Consequently, the centerline 09 is also parallel with side 13*b*.

The present template may be fabricated from any suitable material known in the art for template tool making. However, preferably it is made of aluminum, aluminum alloy, steel, or other metals; plastic; or wood. For ease of use and durability, the template will typically be made of aluminum alloy similar to that found in other measuring and templating tools currently used in the construction trades. Likewise, blade 03 and edge aligning cross member 05 may be joined together by any suitable means of the art such as by welding; by mechanical fasteners including screws, bolts, or rivets; or by bonding with adhesives. Alternatively, blade 03 and cross member 05 may be constructed as an integral unit.

Figure 2:
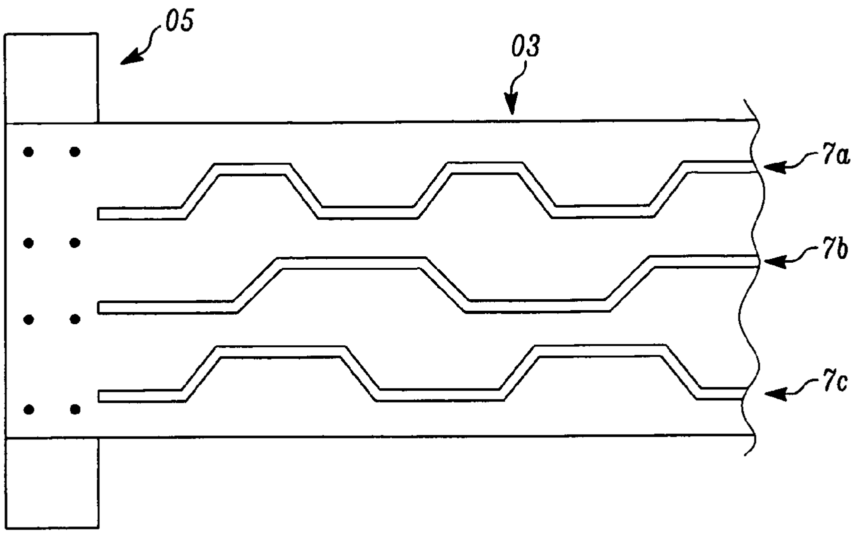
FIG. 2 depicts the multi-groove embodiment of the template.

FIG. 2 illustrates a variation of the basic embodiment wherein blade 03 has two or more different fluting pattern grooves, shown here as grooves 07*a*, 07*b*, and 07*c*. This enables one template tool to match the fluting patterns of different decking panels.

While the template of the present invention may be of any size or any material suitable to perform its intended function, typically it will be comparable in sized, material, and construction to T-squares frequently used in the art of dry-wall installation. However, blade 03 is substantially wider than corresponding blades of conventional dry-wall T-squares to accommodate the one or more grooves in blade 03. Optionally, blade 03 of the template of the present invention may be imprinted with units of linear measurement along one or both of its edges and, thus, optionally it may be used as in conventionally dry-wall installation or similar application.

Figure 3:
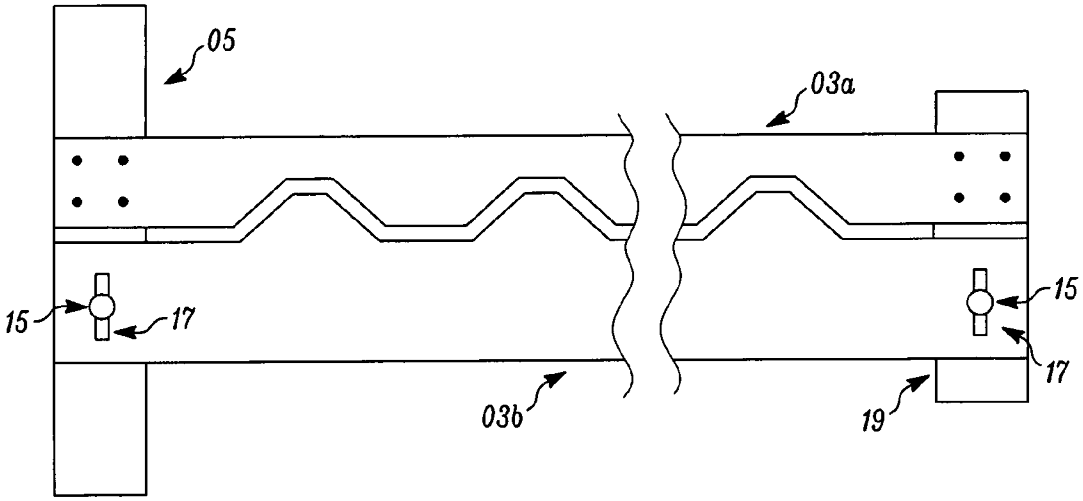
FIG. 3 depicts the adjustable groove embodiment of the template.

FIG. 3 shows an adjustable embodiment wherein blade 03 is comprised of two separate, but complementary, blade elements 03*a* and 03*b*. At least one of the elements is affixed to the edge aligning cross member by a means that allows it to be moved closer to, or away, from the other blade element. For example, as shown in FIG. 3, blade 3*b* is attached to cross member 05 by a thumbscrew 15 threaded into the cross member and extending through slot 17 in blade 3*b*. Tightening thumbscrew 15 locks the blade at the chosen width. The skilled artisan will appreciate that for such an adjustable configuration, a second cross member is required to hold the elements 03*a* and 03*b* in alignment and add stability. Therefore, FIG. 3 shows second cross member 19 at the distal ends of elements 03*a* and 03*b* relative to edge aligning cross member 05. Note that elements 03*a* and 03*b* are joined to member 19 in a corresponding manner as to member 05, i.e. by thumbscrew 15 through slot 17. Thus, the width of the groove(s) may be adjusted to accommodate a marking or cutting instrument. For example, the groove could be made narrow for a utility knife, wider for a pencil, and even wider for the collar of a router bit.

Figure 4A:
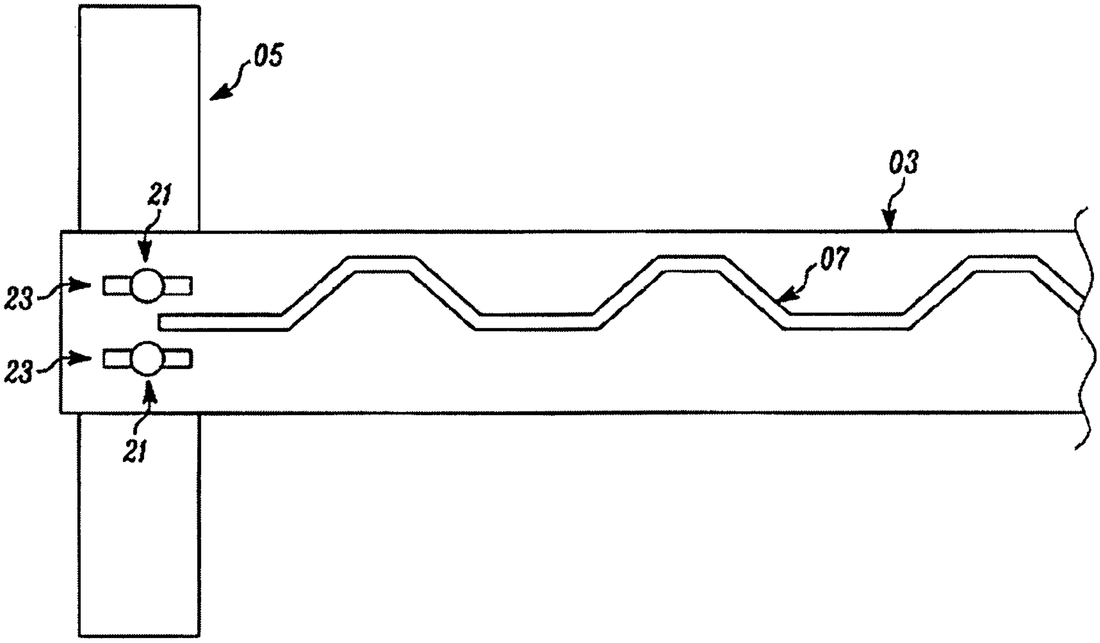
FIG. 4*a* depicts the linearly adjustable embodiment of the template.

FIG. 4*a* shows an adjustable embodiment of the template wherein blade 03, and consequently, groove 07, may be moved linearly with respect to edge alignment cross member 05. For example, such movement might be made possible by thumbscrews 21 threaded into the cross member and extending through slots 23 in blade 3. Such movement would facilitate placing the fluting pattern being cut into the wall board in correct alignment with the fluting pattern in the decking.

Figure 4B:
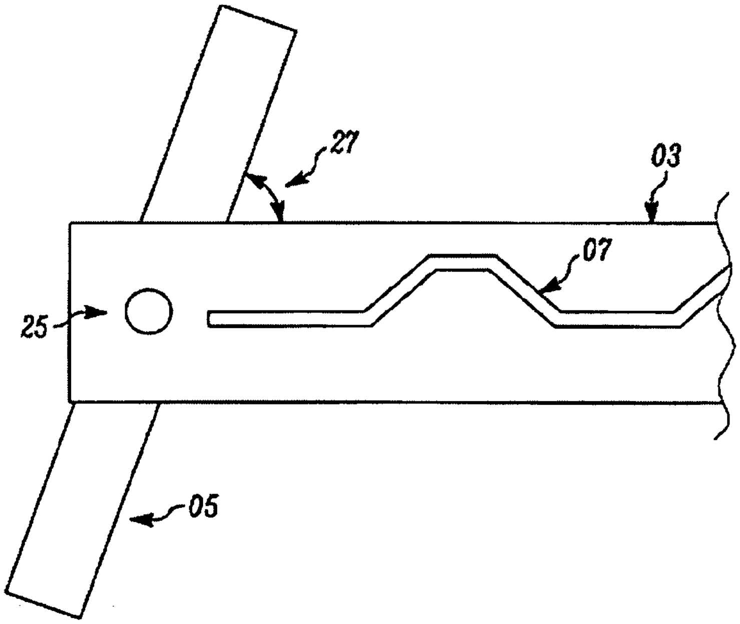
FIG. 4*b* depicts the angularly adjustable embodiment of the template.

FIG. 4*b* illustrates an adjustable embodiment wherein blade 03 may be moved angularly and locked with respect to the edge aligning cross member. In this embodiment, edge alignment cross member 05 pivots about the centerline of blade 03. For example, as shown in FIG. 4*b*, the pivot is a threaded stud embedded in edge aligning cross member 05, extending through a hole in blade 03, and capped with thumb screw 25. Loosening thumb screw 25 and pivoting blade 03 permits angle 27 to range from essentially 0° to essentially 180°. At the desired angle, thumbscrew 25 may be tightened to lock blade 03 in place.

The primary use of the present template is to facilitate preparing an edge of a sheet of wall board to match the fluted pattern of a deck above the wall board. Therefore, the length of blade 03 is conveniently four or more feet because the width of most wall board stock is four feet or a multiple of four feet. For example, dry-wall board (also known as gypsum board) is sold as 4×8 foot and 4×12 foot panels. The present template may be used to mark for cutting or cut directly a wide range of wall board panels currently used in construction, such as dry-wall board, cement-fiber board, concrete board, MDF, HDF, OSB, and plywood. Likewise, the template may also be used to mark or cut sheet goods, such as plastic film, rubber and PVC membrane, and paper. The blade 03 must be wide enough to accommodate groove 07 with our loss of integrity. Therefore, the width will typically be at least about six inches and correspondingly large if the blade has multiple grooves.

The present template is aligned with the edge of a piece of dry wall board with the blade and groove parallel to the edge of the board to be mated with the fluted decking that form a ceiling. A knife, saw, router, or other cutting tool may be passed along the groove, cutting into the wall board. Alternatively, the template can be used to inscribe the fluting pattern on the wall board and the cutting of the wall board may be done is a separate operation. After the wall board has been cut, the template is removed and the wall board is installed so that the concave portions of the fluting of the wall board align with the convex portions of the fluting of the decking.

The present invention figures and examples are not intended to be limiting. One skilled in the art will be able to substitute appropriate materials designs and the like within the scope of the claims that follow.

What is claimed is:

1. A template for use in cutting wall board comprising:

a) a blade with a fluted groove pattern extending substantially the length of the blade;

b) a T square cross member having a perpendicularly aligning edge; and c) a pair of slots in the blade separate from the fluted groove pattern, for attaching the cross member to the blade and allowing the cross member to be linearly adjusted along the length of the blade while remaining perpendicular to the blade.

* * * * *